(12) United States Patent
Lin et al.

(10) Patent No.: US 12,314,483 B2
(45) Date of Patent: May 27, 2025

(54) ELECTRONIC DEVICE

(71) Applicant: ASUSTeK COMPUTER INC., Taipei (TW)

(72) Inventors: Tsung-Yi Lin, Taipei (TW); Chao-Yang Cheng, Taipei (TW); Shang-Yu Hung, Taipei (TW); Shiang-Cong Chen, Taipei (TW); Ying-Yu Chen, Taipei (TW); Wei-Ting Cheng, Taipei (TW); Jyun-Miao Hong, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 18/485,335

(22) Filed: Oct. 12, 2023

(65) Prior Publication Data
US 2024/0211054 A1    Jun. 27, 2024

(30) Foreign Application Priority Data

Dec. 23, 2022 (TW) .................. 111214262
May 2, 2023 (TW) .................. 112116281

(51) Int. Cl.
*G06F 3/02* (2006.01)
*G06F 3/041* (2006.01)

(52) U.S. Cl.
CPC .......... *G06F 3/0202* (2013.01); *G06F 3/0416* (2013.01)

(58) Field of Classification Search
CPC ..................... G06F 3/0414; G06F 2203/04105
See application file for complete search history.

(56) References Cited

U.S. PATENT DOCUMENTS

| | | | | |
|---|---|---|---|---|
| 2007/0200823 A1* | 8/2007 | Bytheway | ............. | G06F 3/0446 345/160 |
| 2008/0024451 A1* | 1/2008 | Aimi | .................. | G01C 21/3611 715/773 |
| 2012/0072863 A1* | 3/2012 | Akifusa | ............. | G06F 3/04883 715/784 |
| 2015/0061902 A1* | 3/2015 | Casparian | ............ | H03K 17/965 341/22 |
| 2016/0026317 A1* | 1/2016 | Bigand | ................... | G06F 3/016 345/173 |
| 2016/0209876 A1* | 7/2016 | Park | ....................... | G06F 1/1652 |
| 2017/0322663 A1* | 11/2017 | Lee | ..................... | G06F 3/04886 |
| 2018/0081480 A1* | 3/2018 | Ran | ........................ | G06F 3/0426 |
| 2018/0232061 A1* | 8/2018 | Cho | ....................... | G06F 3/0354 |
| 2019/0212861 A1* | 7/2019 | Monson | ................ | G06F 3/0446 |

(Continued)

FOREIGN PATENT DOCUMENTS

| | | |
|---|---|---|
| CN | 107659699 | 10/2020 |
| CN | 212569611 | 2/2021 |

(Continued)

*Primary Examiner* — Sepehr Azari
(74) *Attorney, Agent, or Firm* — JCIPRNET (57) ABSTRACT

An electronic device includes a case and a shoulder button module. The shoulder button module is movably disposed in the case and includes a keycap, a push switch, and a touch sensing assembly. The keycap is exposed from the case. The push switch is located in the case and disposed under the keycap. When the keycap is pushed downward, the push switch is triggered. The touch sensing assembly is disposed in the keycap so as to sense an input command touched on the keycap.

10 Claims, 6 Drawing Sheets

(56) References Cited

U.S. PATENT DOCUMENTS

| | | | | |
|---|---|---|---|---|
| 2019/0391656 A1* | 12/2019 | Togawa | ............. | G06F 3/042 |
| 2020/0012354 A1* | 1/2020 | Cho | ............. | G06F 3/038 |
| 2020/0103981 A1* | 4/2020 | Hsu | ............. | G06F 3/0202 |
| 2020/0110492 A1* | 4/2020 | Sun | ............. | G06F 1/1643 |
| 2020/0301519 A1* | 9/2020 | Moon | ............. | G06F 3/03547 |
| 2021/0089182 A1* | 3/2021 | Sheng | ............. | G06F 3/04886 |
| 2021/0365120 A1* | 11/2021 | Ooi | ............. | G06F 3/0414 |
| 2022/0044889 A1* | 2/2022 | Ho | ............. | G02B 6/0083 |
| 2023/0418421 A1* | 12/2023 | Deng | ............. | G06F 3/0445 |

FOREIGN PATENT DOCUMENTS

| | | |
|---|---|---|
| CN | 213209133 | 5/2021 |
| TW | M639525 | 4/2023 |

* cited by examiner

ELECTRONIC DEVICE

CROSS-REFERENCE TO RELATED APPLICATION

This application claims the priority benefits of Taiwan application serial no. 112116281, filed on May 2, 2023, and Taiwan application serial no. 111214262, filed on Dec. 23, 2022. The entirety of each of the above-mentioned patent applications is hereby incorporated by reference herein and made a part of this specification.

BACKGROUND

Technical Field

The disclosure is related to an electronic device which can be touched and pushed.

Description of Related Art

Among gaming-focused electronic products (such as gaming smartphones) on the market, some products have buttons (also known as shoulder buttons) located on the frame of the casing to facilitate the operation of the user when holding the electronic device in a horizontal direction. However, since the shoulder buttons protrude from the device casing, the aesthetics of the overall appearance is spoilt. Some electronic products are not disposed with physical shoulder buttons, but use virtual buttons on the touch screen with pressure sensors below the screen to achieve the effect of simulating shoulder buttons, but the hand feedback brought by physical buttons is absent, resulting in a poor experience. In addition, there are also electronic products that use external shoulder buttons, that is, the shoulder buttons are only hung on the frame of the electronic product when in use, but such shoulder buttons tend to cover part of the screen and need to be carried separately, causing inconvenience to users.

SUMMARY

The disclosure provides an electronic device, which includes a case and a shoulder button module. The shoulder button module is movably disposed in the case and includes a keycap, a push switch, and a touch sensing assembly. The keycap is exposed from the case. The push switch is located in the case and disposed under the keycap. When the keycap is pushed downward, the push switch is triggered. The touch sensing assembly is disposed in the keycap so as to sense an input command touched on the keycap.

Based on the above, the shoulder button module of the disclosure is movably disposed in the case and includes a keycap, a push switch, and a touch sensing assembly. The push switch is disposed under the keycap, and when the keycap is pushed downward, the push switch may be triggered. On the other hand, the touch sensing assembly is disposed in the keycap so as to sense an input command touched on the keycap. Therefore, the shoulder button module can receive pushed or touched input commands, not only retaining the hand feedback brought by physical buttons, but also being more flexible in input operations.

DESCRIPTION OF THE EMBODIMENTS

Figure 1A:
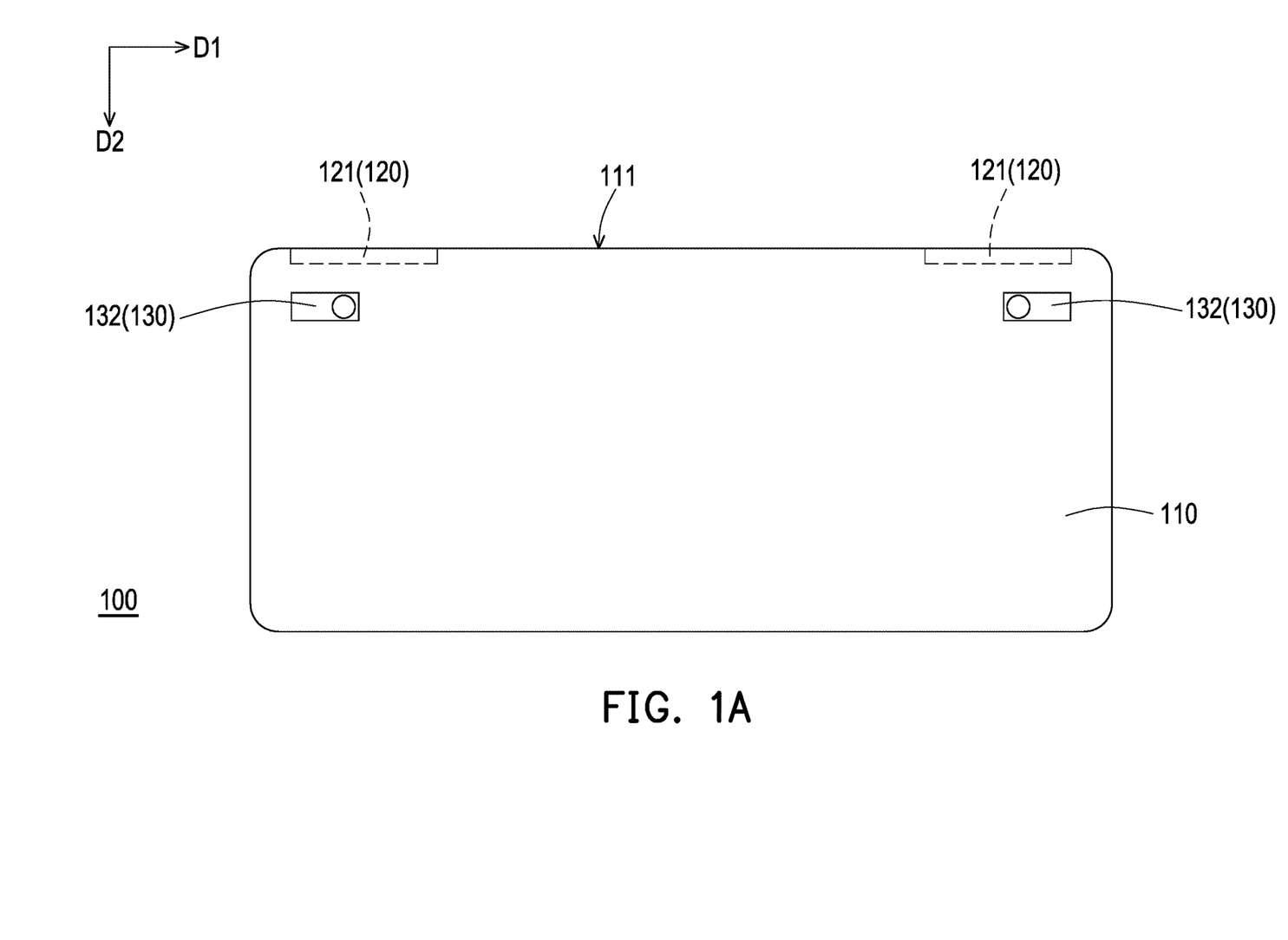
FIG. 1A is a schematic view of an appearance of an electronic device according to an embodiment of the disclosure.
Figure 1B:
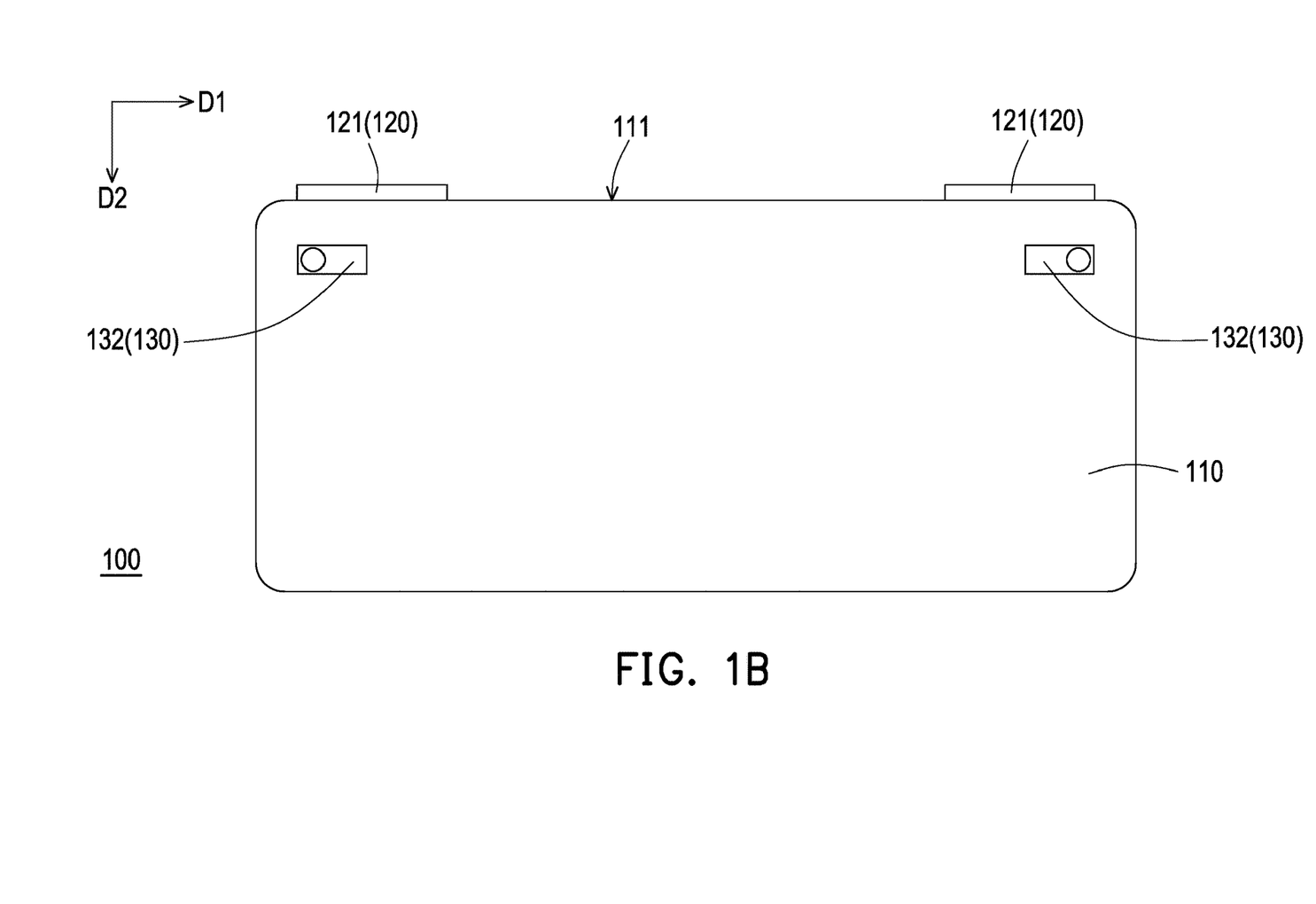
FIG. 1B is a schematic view of an appearance of another mode of FIG. 1A.

FIG. 1A is a schematic view of an appearance of an electronic device according to an embodiment of the disclosure. FIG. 1B is a schematic view of an appearance of another mode of FIG. 1A. It should be noted that, FIG. 1A and FIG. 1B illustrate the back side of an electronic device 100. Please refer to FIG. 1A and FIG. 1B. In this embodiment, the electronic device 100 includes a case 110 and a shoulder button module 120, and the shoulder button module 120 includes a slide assembly 130.

The shoulder button module 120 (illustrated as two) may be movably disposed in the case 110 along a second direction D2 through the slide assembly 130 (illustrated as two), so that the shoulder button module 120 may be transformed from a state of being retracted into the case 110 as shown in FIG. 1A into a state of protruding from the case 110 as shown in FIG. 1B, so as to provide convenient operations for the user when holding the electronic device 100 (for example, holding in a horizontal direction). The electronic device 100 is, for example, a gaming smartphone, but the type of the electronic device 100 is not limited thereto.

It is worth noting that the shoulder button module 120 has multiple ways of receiving commands. For example, when the shoulder button module 120 retracts into the case 110, the shoulder button module 120 may receive a click input (that is, an input command applied to the keycap 121 along the second direction D2) and a swipe input (that is, an input command applied to the keycap 121 along a first direction D1) at the same time. For another example, when the shoulder button module 120 protrudes from the case 110, the shoulder button module 120 may receive a push input (that is, an input command applied to the keycap 121 along the second direction D2 and make the keycap 121 move), or receive a push input and a swipe input at the same time.

Therefore, the electronic device 100 provides multiple input methods, allowing users to switch input methods according to actual needs, and is quite flexible in operation. Of course, in other embodiments, the shoulder button module 120 may not be retracted into the case 110, and the disclosure is not limited thereto. Regarding the method of receiving and switching input commands will be described in detail later.

Figure 2:
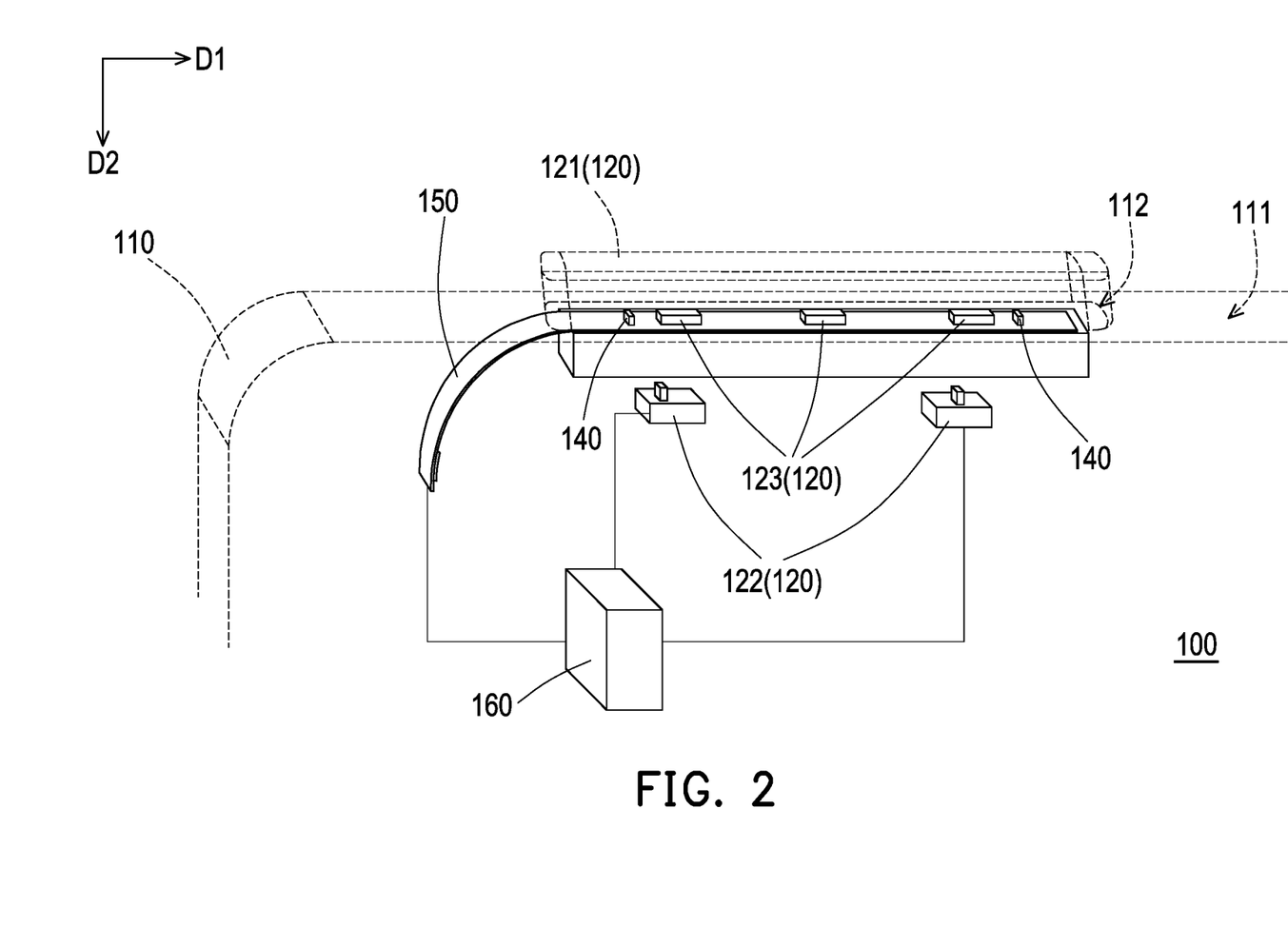
FIG. 2 is a partial schematic view of the electronic device in FIG. 1B.

FIG. 2 is a partial schematic view of the electronic device in FIG. 1B. In order to clearly present the shoulder button module, the case and the keycap in FIG. 2 are illustrated in dotted lines and the slide assembly 130 is hidden. Please refer to FIG. 2. In this embodiment, the shoulder button module 120 includes a keycap 121, a circuit board 150, a touch sensing assembly 123, and a push switch 122. The case 110 includes a side surface 111 and an opening 112 located on the side surface 111, and the opening 112 is an elongated hole extending along the first direction D1, in which the first direction D1 is parallel to the side surface 111 and perpendicular to the second direction D2.

The keycap 121 is exposed from the case 110, extending from the opening 112 and protruding from the side surface 111, but the keycap 121 may also be even with the side surface 111, and the position of the keycap 121 relative to the side surface 111 is not limited thereto. The keycap 121 is suitable for being pushed, so that at least a part of the keycap 121 retracts into the case 110 along the second direction D2.

The circuit board 150 is, for example, a flexible circuit board or a hard circuit board, located under the keycap 121 and electrically connected to the touch sensing assembly 123. The touch sensing assembly 123 is disposed on the circuit board 150 and connected to the keycap 121 and located between the keycap 121 and the circuit board 150, so as to sense an input command (such as a swipe gesture) touched on the keycap 121. The touch sensing assembly 123 in this embodiment is, for example, an ultrasonic pressure sensor, a piezoresistive pressure sensor, or a capacitive pressure sensor, but the type of the touch sensing assembly 123 is not limited thereto. In addition, the touch sensing assemblies 123 are illustrated as three in this embodiment, but the number of touch sensing assemblies 123 is not limited thereto.

The push switch 122 is located in the case 110 and disposed under the keycap 121 and the circuit board 150. Furthermore, the electronic device 100 further includes a processor 160, and the processor 160 is electrically connected to the push switch 122 and the touch sensing assembly 123. When the keycap 121 is pushed downward, the keycap 121 moves into the case 110 along the second direction D2, thereby triggering the push switch 122. After the push switch 122 is triggered, a signal generated by the trigger is transmitted to the processor 160, and the processor 160 may process the trigger input of the push switch 122.

On the other hand, when the user touches the keycap 121, for example, slides a finger on the surface of the keycap 121 along the first direction D1, the touch sensing assembly 123 senses the swipe input on the keycap 121 and generates a corresponding signal. The signal is transmitted to the processor 160, and the processor 160 may process the swipe input command sensed by the touch sensing assembly 123. Therefore, through the cooperation of the push switch 122 and the touch sensing assembly 123, the shoulder button module 120 has the function of receiving the push input and the touch input at the same time.

In this embodiment, the electronic device 100 has a physical keycap 121, and in a process that the keycap 121 is pushed and the push switch 122 is triggered, an excellent hand feedback is brought, which helps improve the user experience. In addition to pushing, the user may also input commands by touching the keycap 121, that is, triggering the shoulder button module 120 with a low force (for example, less than 15 g), which not only saves effort in use, but also provides multiple shoulder button operation methods.

In addition, the shoulder button module 120 of this embodiment may optionally be configured with a light source 140. The light sources 140 (illustrated as two) are, for example, light emitting diodes disposed on the circuit board 150, but the type of the light source 140 is not limited thereto. The keycap 121 is light-transmitting, so that the light emitted by the light source 140 may penetrate the keycap 121 and shine out, so that the user can determine the use state of the shoulder button module 120 conveniently.

Figure 3:
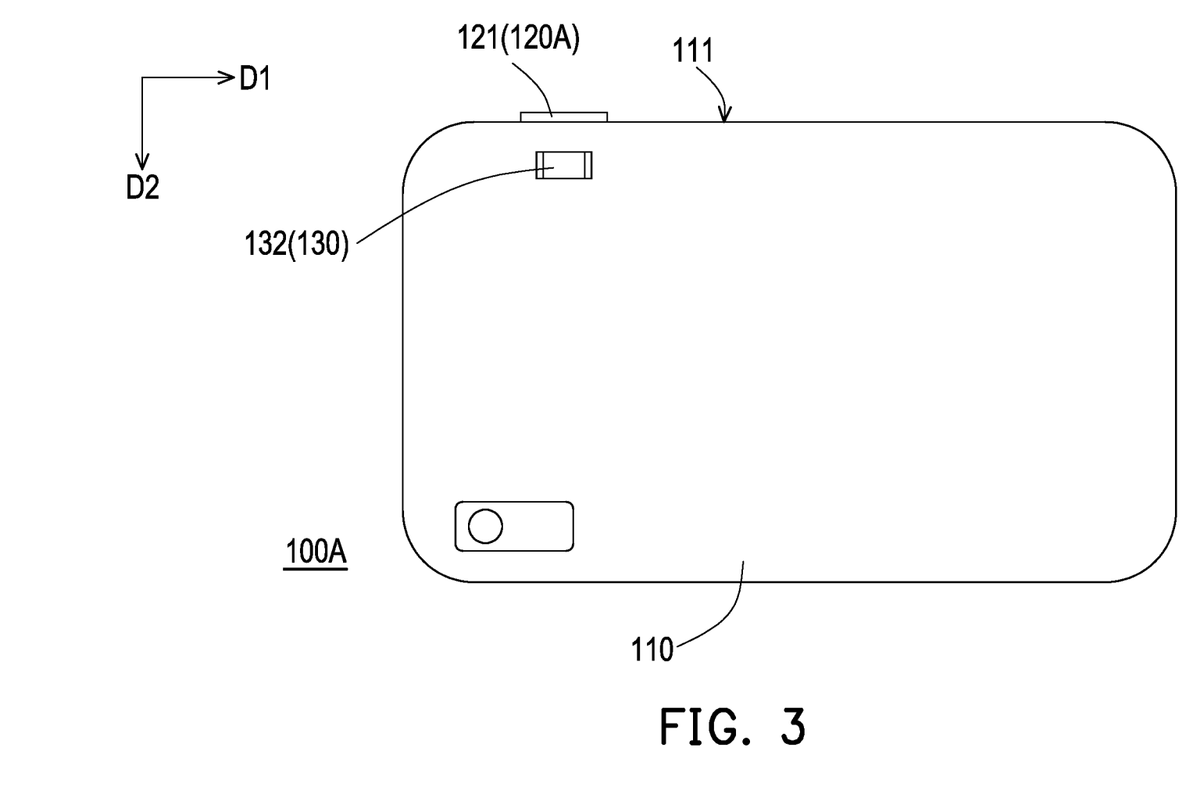
FIG. 3 is a schematic view of an appearance of an electronic device according to another embodiment of the disclosure.
Figure 4A:
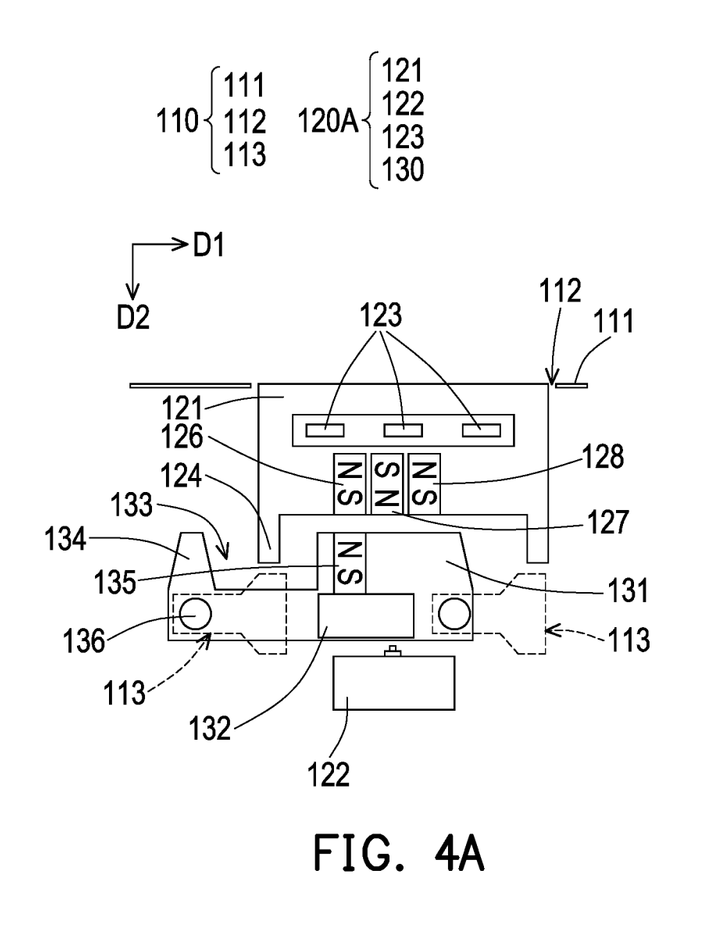
FIG. 4A is a partial perspective view of the electronic device in FIG. 3 when the slide assembly is in a closed position relative to the case.

FIG. 3 is a schematic view of an appearance of an electronic device according to another embodiment of the disclosure. FIG. 4A is a partial perspective view of the electronic device in FIG. 3 when the slide assembly is in a closed position relative to the case. For the convenience of explanation, the shoulder button module and the slide assembly in FIG. 3 are illustrated as one respectively. In order to clearly present the internal structure of the case, the rail of the toggle button in FIG. 4A is hidden. The embodiment shown in FIG. 3 is used to further describe the design of a shoulder button module 120A protruding from the case 110 through the slide assembly 130. Please refer to the following description.

In this embodiment, the slide assembly 130 is movably disposed in the case 110 along the first direction D1, and includes a slide body 131 (FIG. 4A) and a toggle button 132. The slide body 131 is located inside the case 110 and between the keycap 121 and the push switch 122 (FIG. 4A). The toggle button 132 is exposed from the case 110 and integrally formed with the slide body 131. The toggle button 132 may be disposed on the back of an electronic device 100A close to the side surface 111 to facilitate the operation of the user, but the disposed location of the toggle button 132 is not limited thereto. By toggling the toggle button 132, the user may make the keycap 121 extend from the opening 112 and protrude from the side surface 111.

Please refer to FIG. 4A. Specifically, the slide assembly 130 further includes a first magnetic member 135, and the keycap 121 includes a second magnetic member 126 and a third magnetic member 127. The first magnetic member 135 and the second magnetic member 126 face each other with two different magnetic poles. When the slide assembly 130 is in a closed position relative to the case 110, the first magnetic member 135 is aligned with the second magnetic member 126, and the first magnetic member 135 is magnetically attracted to the second magnetic member 126, so that the keycap 121 retracts into the case 110. In this way, the keycap 121 does not arbitrarily protrude from the side surface 111 of the case 110, causing the keycap 121 to be damaged by touching, and the appearance of the electronic device 100A (FIG. 3) is made smooth and beautiful.

Figure 4B:
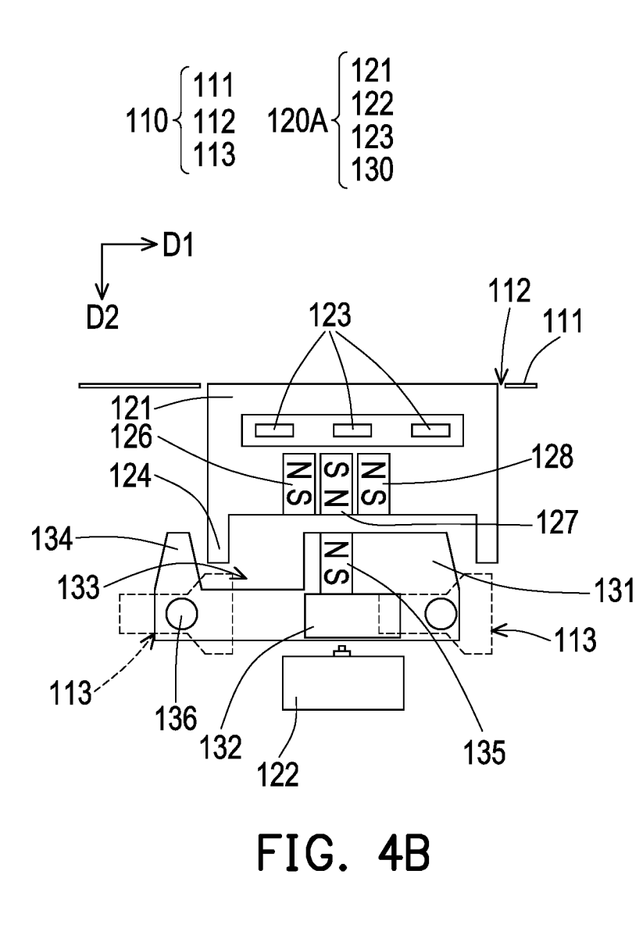
FIG. 4B is a partial perspective view of the electronic device in FIG. 3 when the slide assembly is in the middle position relative to the case.
Figure 4C:
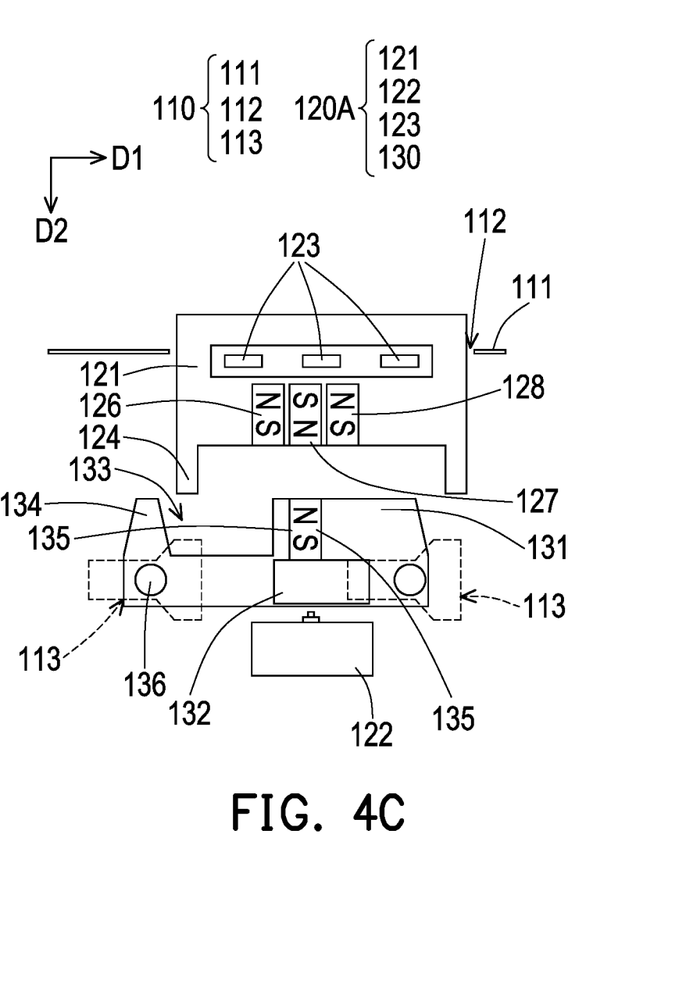
FIG. 4C is a partial perspective view of the keycap in FIG. 4B protruding from the opening driven by the slide assembly.

FIG. 4B is a partial perspective view of the electronic device in FIG. 3 when the slide assembly is in the middle position relative to the case. FIG. 4C is a partial perspective view of the keycap in FIG. 4B protruding from the opening driven by the slide assembly. In order to clearly present the internal structure of the case, the rails of the toggle buttons in FIG. 4B and FIG. 4C are hidden. Please refer to FIG. 4B and FIG. 4C. The first magnetic member 135 and the third magnetic member 127 face each other with the same two magnetic poles. When the toggle button 132 is toggled to move along the first direction D1, the slide assembly 130 moves to a middle position relative to the case 110. At this time, the first magnetic member 135 is aligned with the third magnetic member 127, and the third magnetic member 127 is repelled by the first magnetic member 135, so that the keycap 121 extends from the opening 112 along the second direction D2 and protrudes from the case 110.

Furthermore, the case 110 includes a rail 113, and the slide assembly 130 further includes a protruding column 136 extending into the rail 113. The protruding column 136 is, for example, integrally formed with the slide body 131 and the toggle button 132. A part of the rail 113 extends along the first direction D1, and another part of the rail 113 extends along the second direction D2, so that the rail 113 is formed in a T-shape or an L-shape.

When the slide assembly 130 is in the closed position (FIG. 4A) and the middle position (FIG. 4B and FIG. 4C) relative to the case 110, the protruding column 136 slides along the rail 113 toward the first direction D1. The part of the rail 113 extending along the first direction D1 may ensure the movement direction of the slide assembly 130 and guide the user to only move the toggle button 132 along the first direction D1, so as to help the user operate the toggle button 132 intuitively.

Figure 4D:
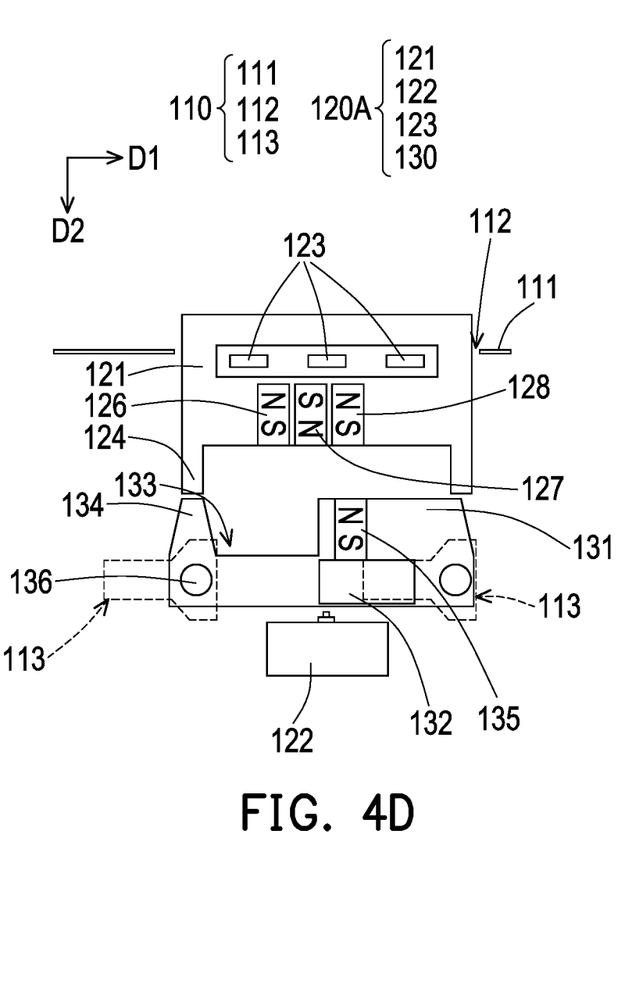
FIG. 4D is a partial perspective view of the electronic device in FIG. 3 when the slide assembly is in an open position relative to the case.

FIG. 4D is a partial perspective view of the electronic device in FIG. 3 when the slide assembly is in an open position relative to the case. In order to clearly present the internal structure of the case, the rail of the toggle button in FIG. 4D is hidden. Please refer to FIG. 4D, the keycap 121 further includes a fourth magnetic member 128. When the slide assembly 130 moves to an open position relative to the case 110, the first magnetic member 135 is magnetically attracted to the fourth magnetic member 128. The middle position (FIG. 4B and FIG. 4C) is between the closed position (FIG. 4A) and the open position (FIG. 4D).

At this time, the first magnetic member 135 is magnetically attracted to the fourth magnetic member 128, and since the first magnetic member 135 magnetically repels the third magnetic member 127 at the same time, the slide assembly 130 does not easily slide relative to the case 110 along the first direction D1. Therefore, the user needs to use a great strength to toggle the toggle button 132 along the first direction D1, so as to prevent the user from touching the toggle button 132 by mistake and causing the keycap 121 to retract into the case 110.

In addition, the slide body 131 of this embodiment includes a groove 133 and an abutting portion 134, and the keycap 121 further includes a protrusion 124. When the slide assembly 130 is in the closed position relative to the case 110, the protrusion 124 is located in the groove 133. When the slide assembly 130 is in the open position relative to the case 110, the abutting portion 134 abuts the protrusion 124, so that the keycap 121 remains protruding from the side surface 111 when not being pushed.

It should also be noted that the first magnetic member 135, the second magnetic member 126, the third magnetic member 127, and the fourth magnetic member 128 in this embodiment are respectively illustrated as one, but the respective numbers of the first magnetic member 135, the second magnetic member 126, the third magnetic member 127, and the fourth magnetic member 128 are not limited thereto.

Next, the manner in which the shoulder button module 120A receives input commands will be described. As shown in FIG. 4A, when the slide assembly 130 is in the closed position relative to the case 110, the keycap 121 retracts into the case 110, and the keycap 121 is blocked by the slide body 131 without moving relative to the push switch 122.

In this state, the push switch 122 is not triggered, and the touch sensing assembly 123 may sense the click input (that is, the input command applied to the keycap 121 along the second direction D2) and the swipe input (that is, the input command applied to the keycap 121 along the first direction D1) at the same time, and the processor 160 (FIG. 2) processes the click input and the swipe input sensed by the touch sensing assembly 123. In this way, when the keycap 121 retracts into the case 110, the shoulder button module 120A has both functions of sensing the push input and the touch input.

As shown in FIG. 4D, after the slide assembly 130 moves relative to the case 110 along the first direction D1, and moves from the closed position to the open position, the keycap 121 extends from the opening 112 and protrudes from the side surface 111, and the keycap 121 is suitable for being pushed by the user along the second direction D2, and the slide body 131 may be driven to move along the second direction D2 to trigger the push switch 122.

At this time, the function of the touch sensing assembly 123 to sense the click input is disabled to avoid conflict with the push switch 122 in processing the push input command. At the same time, the user may also toggle the keycap 121 along the first direction D1, and the touch sensing assembly 123 senses the swipe input, and the trigger input of the push switch 122 and the swipe input sensed by the touch sensing assembly 123 are processed by the processor 160.

In other words, in the state where the keycap 121 protrudes from the side surface 111 of the case 110, the shoulder button module 120A not only has the function of sensing the push input and the touch input, but also has an excellent feedback because of the physical buttons (i.e., the keycap 121), which helps improve the user experience. In other embodiments, the function of the touch sensing assembly 123 to sense the swipe input may be disabled, so that the shoulder button module 120A only has the function of sensing the push input.

In this embodiment, through toggling the toggle button 132 by the user, the slide assembly 130 may make the keycap 121 protrude from the case 110 only through a magnetic force, reducing the friction in the process of the keycap 121 protruding from or retracting into the case 110, thereby making the lifting process of the keycap 121 smooth.

In addition, this design does not need to dispose springs or electromechanical structures. Through using the protrusion 124, the groove 133, and the abutting portion 134 in conjunction with the first magnetic member 135, the second magnetic member 126, the third magnetic member 127, and the fourth magnetic member 128, the keycap 121 protrudes from or retracts into the case 110, which helps to save the internal space of the electronic device 100A (FIG. 3) and reduces the manufacturing cost of the electronic device 100A.

When the user wants to restore the keycap 121 into the case 110, the user only needs to toggle the toggle button 132 along the reverse direction of the first direction D1, and the slide assembly 130 may move relative to the case 110 from the open position (FIG. 4D) to the closed position (FIG. 4A). At this time, the first magnetic member 135 of the keycap 121 is attracted by the second magnetic member 126, and the keycap 121 may retract into the case 110 along the second direction D2.

Based on the above, the shoulder button module of this application is movably disposed in the case and includes the keycap, the push switch, the slide assembly, and the touch sensing assembly. The user can make the shoulder button module protrude from or hide in the case by sliding the toggle button of the slide assembly. The push switch is disposed under the keycap, and when the keycap is pushed downward, the push switch may be triggered. On the other hand, the touch sensing assembly is disposed in the keycap so as to sense an input command touched on the keycap. Furthermore, when the shoulder button module protrudes from the case, the user may push the keycap to make the shoulder button module receive the push input, or the user may push or toggle the keycap to make the shoulder button module receive the push input or the swipe input. When the shoulder button module retracts into the case, the user may click or toggle the keycap, and the shoulder button module may receive the click input or the swipe input. Since the shoulder button module can receive pushed and touched input commands, not only the hand feedback brought by physical buttons is retained, but also the input operation is flexible. In addition, the keycap may be designed to retract into the case, so that the appearance of the electronic device is smooth and beautiful.

What is claimed is:

1. An electronic device, comprising:
    a case;
    a shoulder button module movably disposed in the case, comprising:
        a keycap exposed from the case;
        a push switch located in the case and disposed under the keycap, when the keycap is pushed downward, the push switch is triggered;
        a touch sensing assembly disposed in the keycap so as to sense an input command touched on the keycap, wherein the case comprises a side surface and an opening located on the side surface, and the keycap is adapted to extend from the opening and protrude from the side surface; and
        a slide assembly, movably disposed in the case, wherein the slide assembly comprises a slide body and a toggle button, the slide body is located inside the case, the toggle button is exposed from the case, the slide body is located between the keycap and the push switch, when the slide assembly is in a closed position relative to the case, the keycap retracts into the case, when the slide assembly moves to an open position relative to the case, the keycap extends from the opening and protrudes from the side surface, and the keycap is suitable for being pushed to drive the slide body to move to trigger the push switch.

2. The electronic device according to claim 1, further comprising a processor electrically connected to the push switch and the touch sensing assembly, wherein when the keycap retracts into the case, the keycap is blocked by the slide body and has no relative movement with the push switch, the processor processes a swipe input and a click input sensed by the touch sensing assembly, when the keycap extends from the opening and protrudes from the side surface, the processor processes a trigger input of the push switch and the swipe input sensed by the touch sensing assembly.

3. The electronic device according to claim 1, wherein the slide assembly comprises a first magnetic member, and the keycap comprises a second magnetic member, when the slide assembly is in the closed position relative to the case, the first magnetic member is magnetically attracted to the second magnetic member, so that the keycap retracts into the case.

4. The electronic device according to claim 3, wherein the keycap comprises a third magnetic member, when the slide assembly moves to a middle position relative to the case, the third magnetic member is repelled by the first magnetic member, so that the keycap extends from the opening and protrudes from the case, and the middle position is located between the closed position and the open position.

5. The electronic device according to claim 4, wherein the keycap comprises a fourth magnetic member, and when the slide assembly is in the open position relative to the case, the first magnetic member is magnetically attracted to the fourth magnetic member.

6. The electronic device according to claim 1, wherein the slide body comprises a groove, the keycap comprises a protrusion, and when the slide assembly is in the closed position relative to the case, the protrusion is located in the groove.

7. The electronic device according to claim 1, wherein the slide body comprises an abutting portion, and the keycap comprises a protrusion, when the slide assembly is in the open position relative to the case, the abutting portion abuts the protrusion, so that the keycap remains protruding from the case when not being pushed.

8. The electronic device according to claim 1, wherein the case comprises a rail, a slide assembly comprises a protruding column extending into the rail, a part of the rail extends along a first direction, and another part of the rail extends along a second direction, so that the slide assembly extends along the first direction moves from the closed position to the open position, the keycap is pushed along the second direction, and the slide body is driven to move along the second direction to trigger the push switch.

9. The electronic device according to claim 1, wherein the shoulder button module further comprises a circuit board, wherein the touch sensing assembly is disposed on the circuit board, and the circuit board is located under the keycap, and the touch sensing assembly comprises an ultrasonic pressure sensor, a piezoresistive pressure sensor, or a capacitive pressure sensor.

10. The electronic device according to claim 9, wherein the shoulder button module further comprises a light source disposed on the circuit board, the keycap is light-transmitting, and a light emitted by the light source penetrates the keycap.

* * * * *